(12) United States Patent
Ruettinger et al.

(10) Patent No.: US 11,779,900 B2
(45) Date of Patent: Oct. 10, 2023

(54) EVAPORATIVE EMISSION DEVICE AND ADSORBENT

(71) Applicant: BASF CORPORATION, Florham Park, NJ (US)

(72) Inventors: Wolfgang Ruettinger, East Windsor, NJ (US); Steven Chin, Port Reading, NJ (US); Laif R. Alden, Feasterville, PA (US); Chen Chen, Shanghai (CN); Akash Abraham, Brooklyn, NY (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/727,989

(22) Filed: Dec. 27, 2019

(65) Prior Publication Data

US 2020/0147586 A1 May 14, 2020

Related U.S. Application Data

(63) Continuation of application No. PCT/IB2018/054777, filed on Jun. 27, 2018.

(51) Int. Cl.
*B01J 20/00* (2006.01)
*B01J 20/20* (2006.01)
(Continued)

(52) U.S. Cl.
CPC .......... *B01J 20/20* (2013.01); *B01D 53/0407* (2013.01); *B01J 20/261* (2013.01); *B01J 20/262* (2013.01);
(Continued)

(58) Field of Classification Search
CPC ........ B01J 20/20; B01J 20/261; B01J 20/262; B01J 20/28028; B01J 20/2803; B01J 20/28045; B01J 20/28066; B01J 20/321; B01J 20/3212; B01J 20/3295; B01J 20/28011; B01J 20/324; B01D 53/0407;
(Continued)

(56) References Cited

U.S. PATENT DOCUMENTS 3,171,820 A 3/1965 Volz
4,259,452 A 3/1981 Yukuta et al.
(Continued)

FOREIGN PATENT DOCUMENTS

CN 103925051 A 7/2014
CN 107282011 A 10/2017
(Continued)

OTHER PUBLICATIONS

Extended European Search Report for Application No. 18823094.0 dated Feb. 8, 2021, 8 pages.
(Continued)

*Primary Examiner* — Phutthiwat Wongwian
*Assistant Examiner* — Sherman D Manley
(74) *Attorney, Agent, or Firm* — Lowenstein Sandler LLP

(57) ABSTRACT

The present disclosure relates to hydrocarbon emission control systems. More specifically, the present disclosure relates to substrates coated with hydrocarbon adsorptive coating compositions, air intake systems, and evaporative emission control systems for controlling evaporative emissions of hydrocarbons from motor vehicle engines and fuel systems.

13 Claims, 6 Drawing Sheets

(51) Int. Cl.
| | | |
|---|---|---|
| *B01D 53/04* | (2006.01) | |
| *B01J 20/26* | (2006.01) | |
| *B01J 20/28* | (2006.01) | |
| *B01J 20/32* | (2006.01) | |
| *B60K 15/035* | (2006.01) | |
| *F02M 25/08* | (2006.01) | |

(52) U.S. Cl.
CPC ..... *B01J 20/2803* (2013.01); *B01J 20/28028* (2013.01); *B01J 20/28045* (2013.01); *B01J 20/28066* (2013.01); *B01J 20/321* (2013.01); *B01J 20/3212* (2013.01); *B60K 15/03504* (2013.01); *F02M 25/089* (2013.01); *F02M 25/0854* (2013.01); *B01D 2253/102* (2013.01); *B01D 2253/25* (2013.01); *B01D 2253/306* (2013.01); *B01D 2253/3425* (2013.01); *B01D 2257/702* (2013.01); *B01D 2259/4516* (2013.01); *B01D 2259/4566* (2013.01); *B60K 2015/03514* (2013.01)

(58) Field of Classification Search
CPC ............ B01D 53/002; B01D 2253/102; B01D 2253/25; B01D 2253/306; B01D 2253/3425; B01D 2253/34; B01D 2253/342; B01D 2257/702; B01D 2259/4516; B01D 2259/4566; B01D 2258/06; B60K 15/03504; B60K 2015/03514; B60K 13/02; F02M 25/0854; F02M 25/089; F02M 25/0836; F02M 25/06; Y02T 10/12
See application file for complete search history.

(56) References Cited

U.S. PATENT DOCUMENTS

| | | | |
|---|---|---|---|
| 4,308,841 A | 1/1982 | Kingsley | |
| 4,750,465 A | 6/1988 | Rediker, Jr. et al. | |
| 4,877,001 A | 10/1989 | Kenealy et al. | |
| 5,288,307 A * | 2/1994 | Goltz | B01J 20/26 95/146 |
| 5,658,372 A | 8/1997 | Gadkaree | |
| 5,914,294 A | 6/1999 | Park et al. | |
| 6,136,075 A | 10/2000 | Bragg et al. | |
| 6,197,079 B1 * | 3/2001 | Mori | B01D 39/1692 264/293 |
| 6,464,761 B1 | 10/2002 | Bugli | |
| 6,540,815 B1 * | 4/2003 | Hiltzik | F02M 25/0854 95/146 |
| RE38,844 E | 10/2005 | Hiltzik et al. | |
| 6,976,477 B2 | 12/2005 | Gimby et al. | |
| 7,051,717 B2 * | 5/2006 | Meiller | F02M 25/0854 123/518 |
| 7,118,716 B2 | 10/2006 | Meiller et al. | |
| 7,159,579 B2 * | 1/2007 | Meiller | F02M 25/0854 123/518 |
| 7,186,291 B2 | 3/2007 | Wolff | |
| 7,422,628 B2 | 9/2008 | Foong et al. | |
| 7,442,232 B2 * | 10/2008 | White | B01J 20/3491 502/103 |
| 7,467,620 B1 * | 12/2008 | Reddy | F02M 25/089 123/519 |
| 7,540,904 B2 | 6/2009 | Hoke et al. | |
| 7,578,285 B2 | 8/2009 | Buelow et al. | |
| 7,597,745 B2 | 10/2009 | Lebowitz et al. | |
| 7,641,720 B2 | 1/2010 | Li | |
| 7,708,817 B2 | 5/2010 | Hurley et al. | |
| 7,737,083 B2 * | 6/2010 | von Blucher | A61K 33/44 502/437 |
| 7,753,034 B2 * | 7/2010 | Hoke | B01D 53/02 123/518 |
| 7,763,104 B2 * | 7/2010 | Arruda | B01D 53/0431 96/154 |
| 7,785,702 B2 | 8/2010 | Kamper et al. | |
| 8,012,439 B2 * | 9/2011 | Arnold | B01J 29/7615 60/272 |
| 8,191,535 B2 | 6/2012 | Bellis et al. | |
| 8,205,442 B2 | 6/2012 | Dobert et al. | |
| 8,262,785 B2 | 9/2012 | Barron et al. | |
| 8,372,184 B2 * | 2/2013 | Zimmermann | B01J 20/26 502/526 |
| 8,372,477 B2 | 2/2013 | Buelow et al. | |
| 8,413,433 B2 | 4/2013 | Lupescu | |
| 8,439,013 B2 | 5/2013 | Bellis | |
| 8,475,569 B2 | 7/2013 | Hurley et al. | |
| 8,635,852 B2 | 1/2014 | Lupescu et al. | |
| 8,919,492 B2 | 12/2014 | Metzger et al. | |
| 9,121,373 B2 | 9/2015 | Moyer et al. | |
| 9,541,043 B2 * | 1/2017 | Fedak | F02M 35/0218 |
| 9,732,649 B2 | 8/2017 | Hiltzik et al. | |
| 9,869,281 B2 * | 1/2018 | Cai | F02B 43/10 |
| 10,323,553 B2 | 6/2019 | Hiltzik et al. | |
| 10,960,342 B2 * | 3/2021 | Hiltzik | B01J 20/28045 |
| 2002/0172637 A1 | 11/2002 | Chesneau et al. | |
| 2004/0011197 A1 | 1/2004 | Wernholm et al. | |
| 2004/0050252 A1 | 3/2004 | Wernholm et al. | |
| 2004/0182240 A1 * | 9/2004 | Bause | B01D 53/02 96/108 |
| 2004/0226440 A1 | 11/2004 | Foong et al. | |
| 2005/0241479 A1 * | 11/2005 | Lebowitz | B01D 53/02 95/146 |
| 2005/0241480 A1 * | 11/2005 | Lebowitz | B01D 53/02 95/146 |
| 2006/0183812 A1 | 8/2006 | Miller et al. | |
| 2006/0205830 A1 * | 9/2006 | Lebowitz | C08G 18/7621 95/146 |
| 2006/0240980 A1 * | 10/2006 | Hung | B01J 20/3078 428/312.8 |
| 2007/0107701 A1 | 5/2007 | Buelow et al. | |
| 2007/0113831 A1 | 5/2007 | Hoke et al. | |
| 2008/0251053 A1 | 10/2008 | Shears et al. | |
| 2008/0308075 A1 | 12/2008 | Allen et al. | |
| 2009/0038477 A1 | 2/2009 | Abe et al. | |
| 2009/0038777 A1 | 2/2009 | Chen et al. | |
| 2011/0289955 A1 | 12/2011 | Okano | |
| 2013/0190542 A1 | 7/2013 | Romanos et al. | |
| 2014/0044625 A1 | 2/2014 | Lupescu et al. | |
| 2014/0130765 A1 | 5/2014 | Loftin et al. | |
| 2014/0165542 A1 | 6/2014 | Loftin et al. | |
| 2014/0305309 A1 * | 10/2014 | McKenna | B01D 53/0415 96/108 |
| 2015/0275727 A1 * | 10/2015 | Hiltzik | B01D 53/0415 95/143 |
| 2016/0237313 A1 | 8/2016 | Williams et al. | |
| 2017/0067415 A1 * | 3/2017 | Cai | F02M 25/0854 |
| 2018/0043329 A1 | 2/2018 | Mazyck et al. | |
| 2018/0363594 A1 * | 12/2018 | Byrne | B01D 53/0407 |
| 2019/0127227 A1 | 5/2019 | Zhao et al. | |
| 2020/0147586 A1 | 5/2020 | Ruettinger et al. | |

FOREIGN PATENT DOCUMENTS

| | | |
|---|---|---|
| EP | 2063098 A1 | 5/2009 |
| WO | WO 2009061533 | 5/2009 |
| WO | WO 2009129485 | 10/2009 |
| WO | 2019003157 A1 | 1/2019 |

OTHER PUBLICATIONS

California Evaporative Emission Standards and Test Procedures for 2001 and Subsequent Model Motor Vehicles, State of California Air Resources Board, adopted Aug. 5, 1999, amended Mar. 22, 2012, 93 pages.

Petition for Post Grant Review of U.S. Pat. No. 10,323,553 dated Mar. 2, 2020, AIA Review No. PGR2020-00035, 110 pages.

Ingevity South Carolina, LLC's Patent Owner's Preliminary Response dated Jun. 12, 2020, AIA Review No. PGR2020-00035, 91 pages.

(56) References Cited

OTHER PUBLICATIONS

Petitioner's Reply to Patent Owner's Preliminary Response dated Jul. 23, 2020, AIA Review No. PGR2020-00035, 10 pages.
Patent Owner Ingevity South Carolina, LLC's Sur-Reply dated Jul. 30, 2020, AIA Review No. PGR2020-00035, 6 pages.
Decision Denying Institution of Post-Grant Review, dated Sep. 10, 2020, AIA Review No. PGR2020-00035, 25 pages.
Petition for Post Grant Review of U.S. Pat. No. 10,323,553 dated Mar. 3, 2020, AIA Review No. PGR2020-00037, 118 pages.
Ingevity South Carolina, LLC's Patent Owner's Preliminary Response dated Jun. 12, 2020, AIA Review No. PGR2020-00037, 97 pages.
Petitioner's Reply to Patent Owner's Preliminary Response dated Jul. 31, 2020, AIA Review No. PGR2020-00037, 14 pages.
Patent Owner Ingevity South Carolina, LLC's Sur-Reply dated Aug. 7, 2020, AIA Review No. PGR2020-00037, 10 pages.
Decision Granting Institution of Post-Grant Review, dated Sep. 10, 2020, AIA Review No. PGR2020-00037, 12 pages.
International Search Report and Written Opinion for International Application No. PCT/CN2019/095842 dated Oct. 5, 2019, 8 pages.
European Search Report, dated Mar. 11, 2022, on application No. 19837859.8, 14 pages.

* cited by examiner

EVAPORATIVE EMISSION DEVICE AND ADSORBENT

CROSS-REFERENCE TO RELATED APPLICATIONS

This application is a continuation of International Application No. PCT/IB2018/054777; filed Jun. 27, 2018, which International Application was published by the International Bureau in English on Jan. 3, 2019, and which claims priority to International Application No. PCT/CN2017/090492; filed Jun. 28, 2017, the content of each of which is hereby incorporated by reference in its entirety.

FIELD OF THE INVENTION

The present disclosure relates generally to hydrocarbon emission control systems. More particularly, the present disclosure relates to substrates coated with hydrocarbon adsorptive coating compositions, evaporative emission control system components, and evaporative emission control systems for controlling evaporative emissions of hydrocarbons from motor vehicle engines and fuel systems.

BACKGROUND OF THE INVENTION

Evaporative loss of gasoline fuel from the fuel systems of motor vehicles powered by internal combustion engines is a major potential contributor to atmospheric air pollution by hydrocarbons. Canister systems that employ activated carbon to adsorb the fuel vapor emitted from the fuel systems are used to limit such evaporative emissions. Currently, all vehicles have a fuel vapor canister containing activated carbon pellets to control evaporative emissions. Many fuel vapor canisters also contain an additional control device to capture fuel vapors that escape from the carbon bed during the hot side of diurnal temperature cycling. Current control devices for such emissions contain exclusively carbon-containing honeycomb adsorbents for pressure drop reasons. In such systems, the adsorbed fuel vapor is periodically removed from the activated carbon by purging the canister systems with fresh ambient air, desorbing the fuel vapor from the activated carbon and thereby regenerating the carbon for further adsorption of fuel vapor. Exemplary U.S. patents disclosing canister-based evaporative loss control systems include the following: U.S. Pat. Nos. 4,877,001; 4,750,465; and 4,308,841.

Institution of strict regulations for permissible quantities of hydrocarbon emissions have required progressively tighter control of the quantity of hydrocarbon emissions from motor vehicles, even during periods of disuse. During such periods (i.e., when parked), vehicle fuel systems may be subject to warm environments, which result in increased vapor pressure in the fuel tank and, consequently, the potential for evaporative loss of fuel to the atmosphere.

The afore-mentioned canister systems possess certain limitations in regard to capacity and performance. For example, purge air does not desorb the entire fuel vapor adsorbed on the adsorbent volume, resulting in residual hydrocarbons ("heel") that may be emitted to the atmosphere. The term "heel" as used herein refers to residual hydrocarbons generally present on an adsorbent material when the canister is in a purged or "clean" state and may result in a reduction of the adsorption capacity of the adsorbent. Bleed emissions, on the other hand, refer to emissions that escape from the adsorbent material. Bleed can occur, for example, when the equilibrium between adsorption and desorption favors desorption significantly over adsorption. Such emissions can occur when a vehicle has been subjected to diurnal temperature changes over a period of several days, commonly called "diurnal breathing losses." Certain regulations make it desirable for these diurnal breathing loss (DBL) emissions from the canister system to be maintained at very low levels. For example, as of Mar. 22, 2012, California Low Emission Vehicle Regulation (LEV-III) requires canister DBL emissions for 2001 and subsequent model motor vehicles not to exceed 20 mg as per the Bleed Emissions Test Procedure (BETP).

Stricter regulations on DBL emissions continue to prompt development of improved evaporative emission control systems, particularly for use in vehicles with reduced purge volumes (i.e., hybrid vehicles). Such vehicles may otherwise produce high DBL emissions due to lower purge frequency, which equates to lower total purge volume and higher residual hydrocarbon heel. Accordingly, it is desirable to have an evaporative emission control system with low DBL emissions despite low volume and/or infrequent purge cycles.

Previously disclosed is a method of limiting the hydrocarbon emissions under stringent DBL conditions by routing the fuel vapor through an initial adsorbent volume and then at least one subsequent adsorbent volume prior to venting to the atmosphere, wherein the initial adsorbent volume has a higher adsorption capacity than the subsequent adsorbent volume. See U.S. Pat. No. RE38,844.

Also previously disclosed is an evaporative emission control canister system device with high purge efficiency and moderate butane working capacity having an initial, and at least one subsequent, adsorbent volume and with an effective butane working capacity (BWC) of less than 3 g/dL, a g-total BWC of between 2 grams and 6 grams, and two-day diurnal breathing loss (DBL) emissions of no more than 20 mg at no more than about 210 liters of purge, applied after a 40 g/hr butane loading step. See U.S. Patent Application Pub. No. 2015/0275727.

Additional sources of evaporative emissions of fuel-derived hydrocarbons include the engine, the exhaust gas recirculation (EGR) system and air intake system. It has been found that a significant amount of volatile hydrocarbons from several sources collect in the air intake system of the automobile engine after the engine has been shut off. Absent of an evaporative emission capture technology, these hydrocarbons are discharged into the atmosphere after the engine has been shut off. Thus, reducing or eliminating hydrocarbon emissions discharge in the air intake system is desirable.

A significant portion of a vehicle's evaporative emissions are emitted from the air intake system during the vehicle's off-cycle as a result of fuel injector leakage, residual fuel puddle evaporation, and blow-by gas from the positive crankcase ventilation (PCV) system. Ideally, the hydrocarbon emissions are retained with the air intake system until the powertrain is used again, when the emissions retention system releases the hydrocarbons to be consumed and controlled through the normal exhaust emission control systems.

Prior art solutions to controlling the outward flow of hydrocarbon emissions from air intake systems include careful shaping of the ducting and filter box; incorporation of carbon adsorbents into the air intake system; and filters.

A challenge for creating a hydrocarbon emissions adsorption system for adsorption of emissions collected in the air intake system is to minimize the impact on air intake restriction, add little extra weight to the system, and yet provide sufficient adsorption capacity for a particular application. Further, despite previously disclosed devices for capturing evaporative hydrocarbon emissions from the fuel system, there remains a need for evaporative emission control systems with high efficiency to reduce space requirements and weight while further reducing the quantity of potential evaporative emissions under a variety of conditions.

SUMMARY OF THE INVENTION

A coated substrate adapted for hydrocarbon adsorption, an air intake system configured for controlling evaporative emissions, and an evaporative emission control system are provided. The disclosed coated substrate, components and systems are useful in controlling evaporative hydrocarbon emissions and may provide low diurnal breathing loss (DBL) emissions even under a low purge condition. The coated substrates provided remove evaporative emissions generated in an internal combustion engine and/or associated fuel source components before the emissions can be released into the atmosphere.

In one aspect is provided a coated substrate adapted for hydrocarbon adsorption comprising a substrate comprising at least one surface having a hydrocarbon adsorbent coating thereon, the hydrocarbon adsorbent coating comprising particulate carbon and a binder, wherein the particulate carbon has a BET surface area of at least about 1400 $m^2/g$. The particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

In one embodiment, the BET surface area of the particulate carbon is at least about 1600 $m^2/g$. In one embodiment, the BET surface area of the particulate carbon is from about 1400 $m^2/g$ to about 2500 $m^2/g$. In some embodiments, the BET surface area of the particulate carbon is from about 1600 $m^2/g$ to about 2500 $m^2/g$.

In some embodiments, the particulate carbon has a second cycle n-butane adsorption capacity of at least about 12% n-butane by weight. In some embodiments, the particulate carbon has a second cycle n-butane adsorption capacity of about 9% by weight to about 15% by weight.

In some embodiments, the binder is present in an amount from about 10% to about 50% by weight relative to the particulate carbon. In some embodiments, the binder is an organic polymer. In some embodiments, the binder is selected from the group consisting of an acrylic/styrene copolymer latex, a styrene-butadiene copolymer latex, a polyurethane, and mixtures thereof.

In one embodiment, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane. In some embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In one embodiment, the substrate is a non-woven fabric. In some embodiments, the substrate is an extruded media. In some embodiments, the extruded media is a honeycomb. In other embodiments, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the polyurethane is a polyether or polyester. In some embodiments, the foam is a reticulated polyurethane. Many such foams of varying porosity are commercially available from multiple sources, and are well known in the art. Such foams may be prepared according to methods such as those disclosed in, for example, U.S. Pat. No. 3,171,820 to Volz and U.S. Pat. No. 4,259,452 to Yukuta et al., both of which are incorporated herein by reference for their teachings of reticulated polyurethane foams.

In some embodiments, the thickness of the coating on the substrate is less than about 500 microns.

In another aspect is provided an air intake system configured for controlling evaporative emissions from a motor vehicle with a combustion engine, the system comprising an air intake duct, an air filter chamber positioned to receive air from the air intake duct, and one or more clean air ducts in fluid communication with the air filter chamber and the combustion engine for transporting air from the air filter chamber to the combustion engine. At least a portion of an inner surface of at least one of said air intake duct, said air filter chamber and said clean air ducts comprises a hydrocarbon adsorbent coating or is in contact with a substrate coated with a hydrocarbon adsorbent coating such that the hydrocarbon adsorbent coating is in fluid contact with a pathway for entry of combustion air into said combustion engine of said motor vehicle. The hydrocarbon adsorbent coating comprises particulate carbon and a binder, wherein the particulate carbon has a BET surface area of at least about 1400 $m^2/gram$ and wherein the particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes. During the engine off-cycle, evaporative emissions, which can bleed from the engine and through the air intake system to the atmosphere, are adsorbed by the hydrocarbon adsorbent, thereby reducing evaporative emissions. During engine operation, atmospheric air is introduced into the air intake system, whereby the hydrocarbons, which were previously adsorbed by the hydrocarbon adsorbent, are desorbed and circulated back to the engine for combustion through the air filter outlet duct.

In one embodiment, the BET surface area of the particulate carbon is at least about 1600 $m^2/g$. In one embodiment, the BET surface area of the particulate carbon is from about 1400 $m^2/g$ to about 2500 $m^2/g$. In some embodiments, the BET surface area of the particulate carbon is from about 1600 $m^2/g$ to about 2500 $m^2/g$.

In some embodiments, the particulate carbon has a second cycle n-butane adsorption capacity of at least about 12% n-butane by weight. In some embodiments, the particulate carbon has a second cycle n-butane adsorption capacity of about 9% by weight to about 15% by weight.

In some embodiments, the binder is present in an amount from about 10% to about 50% by weight relative to the particulate carbon. In some embodiments, the binder is an organic polymer. In some embodiments, the binder is selected from the group consisting of an acrylic/styrene copolymer latex, a styrene-butadiene copolymer latex, a polyurethane, and mixtures thereof.

In one embodiment, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

In some embodiments, the thickness of the hydrocarbon adsorbent coating on the substrate is less than about 500 microns.

In one embodiment, the said portion of an inner surface of the said air filter chamber is coated with the hydrocarbon adsorbent coating.

In other embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In one embodiment, the substrate is an adhered non-woven. In some embodiments, the adhered non-woven is adhered to the said portion of the inner surface of the air filter chamber.

In yet another aspect is provided an evaporative emission control system comprising a fuel tank for fuel storage, an internal combustion engine adapted to consume the fuel and an evaporative emission control canister system. The canister system comprises an evaporative emission control canister and a bleed emission scrubber. The evaporative emission control canister comprises a first adsorbent volume, a fuel vapor purge tube connecting the evaporative emission control canister to the engine, a fuel vapor inlet conduit for venting the fuel tank to the evaporative emission control canister, and a vent conduit for venting the evaporative emission control canister to the atmosphere and for admission of purge air to the evaporative emission control canister system. The evaporative emission control canister system is defined by a fuel vapor flow path from the fuel vapor inlet conduit to the first adsorbent volume, toward the bleed emission scrubber and to the vent conduit, and by a reciprocal air flow path from the vent conduit to the bleed emission scrubber, toward the first adsorbent volume, and toward the fuel vapor purge tube. The bleed emission scrubber comprises at least a second adsorbent volume, the second adsorbent volume comprising a coated substrate adapted for hydrocarbon adsorption, wherein the coated substrate comprises at least one surface, and a hydrocarbon adsorbent coating on the at least one surface, the hydrocarbon adsorbent coating comprising particulate carbon and a binder. The particulate carbon has a BET surface area of at least about 1400 m$^2$/gram. The particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

The fuel vapor that bleeds from the fuel tank is removed by the adsorbents in the canister system so that the amount of fuel vapor released into the atmosphere is reduced. At the time of operating the engine, atmospheric air is introduced into the canister system as a purge stream, whereby the hydrocarbons, which were previously adsorbed by the hydrocarbon adsorbent, are desorbed and recirculated to the engine for combustion through a purge line.

In one embodiment, the BET surface area of the particulate carbon is at least about 1600 m$^2$/g. In one embodiment, the BET surface area of the particulate carbon is from about 1400 m$^2$/g to about 2500 m$^2$/g. In some embodiments, the BET surface area of the particulate carbon is from about 1600 m$^2$/g to about 2500 m$^2$/g.

In some embodiments, the particulate carbon has a second cycle n-butane adsorption capacity of at least about 12% n-butane by weight. In some embodiments, the particulate carbon has a second cycle n-butane adsorption capacity of about 9% by weight to about 15% by weight.

In some embodiments, the binder is present in an amount from about 10% to about 50% by weight relative to the particulate carbon. In some embodiments, the binder is an organic polymer. In some embodiments, the binder is selected from the group consisting of an acrylic/styrene copolymer latex, a styrene-butadiene copolymer latex, a polyurethane, and mixtures thereof.

In one embodiment, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

In some embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In some embodiments, the substrate is an extruded media. In some embodiments, the extruded media is a honeycomb. In other embodiments, the substrate is a foam. In one embodiment, the foam has greater than about 10 pores per inch. In some embodiments, the foam has greater than about 20 pores per inch. In some embodiments, the foam has between about 15 and about 40 pores per inch. In one embodiment, the foam is a polyurethane. In some embodiments, the foam is a reticulated polyurethane. In some embodiments, the polyurethane is a polyether or polyester.

In some embodiments, the thickness of the coating on the substrate is less than about 500 microns.

In some embodiments, the second adsorbent volume of the evaporative emission control system, when subjected to a butane breakthrough test at an adsorbent volume of 29×100 mm, has a third cycle butane breakthrough time at a purge volume of less than 100 1.6 L bed volumes that is within about 10% of the third cycle butane breakthrough time at a purge volume of 390 1.6 L bed volumes. The third cycle butane breakthrough is the time (in seconds) at which the outlet concentration of butane from the adsorbent volume reaches 100 ppm as measured by flame ionization detection during a third loading step of the butane breakthrough test. The butane breakthrough test comprises placing a test adsorbent volume in a sample cell, loading the sample cell with a 1:1 butane/N$_2$ gas mixture at a flow rate of 134 mL/min (10 g/hour of butane flow) for 45 minutes, the direction of flow being upward from the bottom of the sample cell to the top, purging the sample cell with N$_2$ at 100 mL/min for 10 minutes in the same flow direction, desorbing the sample cell with a 25 L/min flow of air in the opposite direction (top to bottom) for a time sufficient to reach the desired number of 1.6 L bed volumes, and repeating the loading, purging and desorbing steps until three load/purge/desorb cycles are complete.

In some embodiments the second adsorbent volume of the evaporative emission control system, when subjected to the butane breakthrough test at an adsorbent volume of 29×100 mm, has a third cycle butane breakthrough time at a purge volume of less than 80 1.6 L bed volumes that is within about 10% of the third cycle butane breakthrough time at a purge volume of 390 1.6 L bed volumes. In some embodiments the second adsorbent volume of the evaporative emission control system, when subjected to the butane breakthrough test at an adsorbent volume of 29×100 mm, has a third cycle butane breakthrough time at a purge volume of less than 60 1.6 L bed volumes that is within about 10% of the third cycle butane breakthrough time at a purge volume of 390 1.6 L bed volumes. In some embodiments the second adsorbent volume of the evaporative emission control system, when subjected to the butane breakthrough test at an adsorbent volume of 29×100 mm, has a third cycle butane breakthrough time at a purge volume of less than 40 1.6 L bed volumes that is within about 10% of the third cycle butane breakthrough time at a purge volume of 390 1.6 L bed volumes. In some embodiments the second adsorbent volume of the evaporative emission control system, when subjected to a butane breakthrough test at an adsorbent volume of 29×100 mm, has a third cycle butane breakthrough time at a purge volume of less than 100 1.6 L bed volumes of at least about 800 seconds.

In some embodiments, the bleed emission scrubber further comprises a third adsorbent volume wherein the second adsorbent volume is a monolithic substrate and the third adsorbent volume is a reticulated polyurethane foam.

In some embodiments, the 2-Day Diurnal Breathing Loss (DBL) of the evaporative emission control system is less than about 20 mg under the California Bleed Emission Test Procedure (BETP).

The invention includes, without limitation, the following embodiments.

Embodiment 1: A coated substrate adapted for hydrocarbon adsorption comprising a substrate comprising at least one surface having a hydrocarbon adsorbent coating thereon, the hydrocarbon adsorbent coating comprising particulate carbon and a binder; wherein the particulate carbon has a BET surface area of at least about 1400 $m^2/g$; and wherein the particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

Embodiment 2: The coated substrate of the preceding embodiment, wherein the BET surface area of the particulate carbon is at least about 1600 $m^2/g$.

Embodiment 3: The coated substrate of any preceding embodiment, wherein the BET surface area of the particulate carbon is from about 1400 $m^2/g$ to about 2500 $m^2/g$.

Embodiment 4: The coated substrate of any preceding embodiment, wherein the BET surface area of the particulate carbon is from about 1600 $m^2/g$ to about 2500 $m^2/g$.

Embodiment 5: The coated substrate of any preceding embodiment, wherein the particulate carbon has a second cycle n-butane adsorption capacity of at least about 12% n-butane by weight.

Embodiment 6: The coated substrate of any preceding embodiment, wherein the particulate carbon has a second cycle n-butane adsorption capacity of about 9% by weight to about 15% by weight.

Embodiment 7: The coated substrate of any preceding embodiment, wherein the binder is present in an amount from about 10% to about 50% by weight relative to the particulate carbon.

Embodiment 8: The coated substrate of any preceding embodiment, wherein the binder is an organic polymer.

Embodiment 9: The coated substrate of any preceding embodiment, wherein the binder is selected from the group consisting of an acrylic/styrene copolymer latex, a styrene-butadiene copolymer latex, a polyurethane, and mixtures thereof.

Embodiment 10: The coated substrate of any preceding embodiment, wherein the substrate is a plastic.

Embodiment 11: The coated substrate of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

Embodiment 12: The coated substrate of any preceding embodiment, wherein the substrate is selected from the group consisting of foams, monolithic materials, nonwovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

Embodiment 13: The coated substrate of any preceding embodiment, wherein the substrate is an extruded media.

Embodiment 14: The coated substrate of any preceding embodiment, wherein the extruded media is a honeycomb.

Embodiment 15: The coated substrate of any preceding embodiment, wherein the substrate is a foam.

Embodiment 16: The coated substrate of any preceding embodiment, wherein the foam has greater than about 10 pores per inch.

Embodiment 17: The coated substrate of any preceding embodiment, wherein the foam has greater than about 20 pores per inch.

Embodiment 18: The coated substrate of any preceding embodiment, wherein the foam has between about 15 and about 40 pores per inch.

Embodiment 19: The coated substrate of any preceding embodiment, wherein the foam is a reticulated polyurethane.

Embodiment 20: The coated substrate of any preceding embodiment, wherein the coating thickness is less than about 500 microns.

Embodiment 21: The coated substrate of any preceding embodiment, wherein the substrate is a non-woven fabric.

Embodiment 22: An air intake system configured for controlling evaporative emissions from a motor vehicle with a combustion engine, said system comprising an air intake duct, an air cleaner housing positioned to receive air from the air intake duct, and one or more clean air ducts in fluid communication with the air cleaner housing and the combustion engine for transporting air from the air filter chamber to the combustion engine; wherein at least a portion of an inner surface of at least one of said air intake duct, said air cleaner housing and said clean air ducts comprises a hydrocarbon adsorbent coating or is in contact with a substrate coated with a hydrocarbon adsorbent coating such that the hydrocarbon adsorbent coating is in fluid contact with a pathway for entry of combustion air into said combustion engine of said motor vehicle; wherein the hydrocarbon adsorbent coating comprises particulate carbon and a binder; wherein the particulate carbon has a BET surface area of at least about 1400 $m^2$/gram; and wherein the particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

Embodiment 23: The air intake system of any previous embodiment, wherein the BET surface area of the particulate carbon is at least about 1600 $m^2$/g.

Embodiment 24: The air intake system of any preceding embodiment, wherein the BET surface area of the particulate carbon is from about 1400 $m^2$/g to about 2500 $m^2$/g.

Embodiment 25: The air intake system of any preceding embodiment, wherein the BET surface area of the particulate carbon is from about 1600 $m^2$/g to about 2500 $m^2$/g.

Embodiment 26: The air intake system of any preceding embodiment, wherein the particulate carbon has a second cycle n-butane adsorption capacity of at least about 12% n-butane by weight.

Embodiment 27: The air intake system of any preceding embodiment, wherein the particulate carbon has a second cycle n-butane adsorption capacity of about 9% by weight to about 15% by weight.

Embodiment 28: The air intake system of any preceding embodiment, wherein the binder is present in an amount from about 10% to about 50% by weight relative to the particulate carbon.

Embodiment 29: The air intake system of any preceding embodiment, wherein the binder is an organic polymer.

Embodiment 30: The air intake system of any preceding embodiment, wherein the binder is selected from the group consisting of an acrylic/styrene copolymer latex, a styrene-butadiene copolymer latex, a polyurethane, and mixtures thereof.

Embodiment 31: The air intake system of any preceding embodiment, wherein the substrate is a plastic.

Embodiment 32: The air intake system of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

Embodiment 33: The air intake system of any preceding embodiment, wherein the hydrocarbon adsorbent coating thickness is less than about 500 microns.

Embodiment 34: 34. The air intake system of any preceding embodiment, wherein the said portion of an inner surface of the said air filter chamber is coated with the hydrocarbon adsorbent coating.

Embodiment 35: The air intake system of any preceding embodiment, wherein the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

Embodiment 36: The air intake system of any preceding embodiment, wherein the substrate is an adhered non-woven.

Embodiment 37: The air intake system of any preceding embodiment, wherein the adhered non-woven is adhered to the said portion of the inner surface of the air filter chamber.

Embodiment 38: An evaporative emission control system comprising a fuel tank for fuel storage; an internal combustion engine adapted to consume the fuel; and an evaporative emission control canister system, the canister system comprising: an evaporative emission control canister; and a bleed emission scrubber; the evaporative emission control canister comprising: a first adsorbent volume, a fuel vapor purge tube connecting the evaporative emission control canister to the engine, a fuel vapor inlet conduit for venting the fuel tank to the evaporative emission control canister, and a vent conduit for venting the evaporative emission control canister to the atmosphere and for admission of purge air to the evaporative emission control canister system; wherein the evaporative emission control canister system is defined by a fuel vapor flow path from the fuel vapor inlet conduit to the first adsorbent volume, toward the bleed emission scrubber and to the vent conduit, and by a reciprocal air flow path from the vent conduit to the bleed emission scrubber, toward the first adsorbent volume, and toward the fuel vapor purge tube; wherein the bleed emission scrubber comprises at least a second adsorbent volume, the second adsorbent volume comprising a coated substrate adapted for hydrocarbon adsorption, wherein the coated substrate comprises: at least one surface, and a hydrocarbon adsorbent coating on the at least one surface, the hydrocarbon adsorbent coating comprising particulate carbon and a binder; wherein the particulate carbon has a BET surface area of at least about 1400 $m^2$/gram; and wherein the particulate carbon has a second cycle n-butane adsorption capacity of at least about 9% n-butane by weight, after being equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

Embodiment 39: The evaporative emission control system of any preceding embodiment, wherein the BET surface area of the particulate carbon is at least about 1600 $m^2$/g.

Embodiment 40: The evaporative emission control system of any preceding embodiment, wherein the BET surface area of the particulate carbon is from about 1400 $m^2$/g to about 2500 $m^2$/g.

Embodiment 41: The evaporative emission control system of any preceding embodiment, wherein the BET surface area of the particulate carbon is from about 1600 m$^2$/g to about 2500 m$^2$/g.

Embodiment 42: The evaporative emission control system of any preceding embodiment, wherein the particulate carbon has a second cycle n-butane adsorption capacity of at least about 12% n-butane by weight.

Embodiment 43: The evaporative emission control system of any preceding embodiment, wherein the particulate carbon has a second cycle n-butane adsorption capacity of about 9% by weight to about 15% by weight.

Embodiment 44: The evaporative emission control system of any preceding embodiment, wherein the binder is present in an amount from about 10% to about 50% by weight relative to the particulate carbon.

Embodiment 45: The evaporative emission control system of any preceding embodiment, wherein the binder is an organic polymer.

Embodiment 46: The evaporative emission control system of claim 38, wherein the binder is selected from the group consisting of an acrylic/styrene copolymer latex, a styrene-butadiene copolymer latex, a polyurethane, and mixtures thereof.

Embodiment 47: The evaporative emission control system of any preceding embodiment, wherein the substrate is a plastic.

Embodiment 48: The evaporative emission control system of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

Embodiment 49: The evaporative emission control system of any preceding embodiment, wherein the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

Embodiment 50: The evaporative emission control system of any preceding embodiment, wherein the substrate is an extruded media.

Embodiment 51: The evaporative emission control system of any preceding embodiment, wherein the extruded media is a honeycomb.

Embodiment 52: The evaporative emission control system of any preceding embodiment, wherein the substrate is a foam.

Embodiment 53: The evaporative emission control system of any preceding embodiment, wherein the foam has greater than about 10 pores per inch.

Embodiment 54: The evaporative emission control system of any preceding embodiment, wherein the foam has greater than about 20 pores per inch.

Embodiment 55: The evaporative emission control system of any preceding embodiment, wherein the foam has between about 15 and about 40 pores per inch.

Embodiment 56: The evaporative emission control system of any preceding embodiment, wherein the foam is a reticulated polyurethane.

Embodiment 57: The evaporative emission control system of any preceding embodiment, wherein the coating thickness is less than about 500 microns.

Embodiment 58: The evaporative emission control system of any of any preceding embodiment, wherein the second adsorbent volume, when subjected to a butane breakthrough test at an adsorbent volume of 29×100 mm, has a third cycle butane breakthrough time at a purge volume of less than 100 1.6 L bed volumes that is within about 10% of the third cycle butane breakthrough time at a purge volume of 390 1.6 L bed volumes, wherein the third cycle butane breakthrough is the time (in seconds) at which the outlet concentration of butane from the adsorbent volume reaches 100 ppm as measured by flame ionization detection during a third loading step of the butane breakthrough test, the butane breakthrough test comprising: placing a test adsorbent volume in a sample cell, loading the sample cell with a 1:1 butane/N$_2$ gas mixture at a flow rate of 134 mL/min (10 g/hour of butane flow) for 45 minutes, the direction of flow being upward from the bottom of the sample cell to the top, purging the sample cell with N$_2$ at 100 mL/min for 10 minutes in the same flow direction, desorbing the sample cell with a 25 L/min flow of air in the opposite direction (top to bottom) for a time sufficient to reach the desired number of 1.6 L bed volumes, and repeating the loading, purging and desorbing steps until three load/purge/desorb cycles are complete.

Embodiment 59: The evaporative emission control system of any preceding embodiment, wherein the second adsorbent volume, when subjected to the butane breakthrough test at an adsorbent volume of 29×100 mm, has a third cycle butane breakthrough time at a purge volume of less than 80 1.6 L bed volumes that is within about 10% of the third cycle butane breakthrough time at a purge volume of 390 1.6 L bed volumes.

Embodiment 60: The evaporative emission control system of any preceding embodiment, wherein the second adsorbent volume, when subjected to the butane breakthrough test at an adsorbent volume of 29×100 mm, has a third cycle butane breakthrough time at a purge volume of less than 60 1.6 L bed volumes that is within about 10% of the third cycle butane breakthrough time at a purge volume of 390 1.6 L bed volumes.

Embodiment 61: The evaporative emission control system of any preceding embodiment, wherein the second adsorbent volume, when subjected to the butane breakthrough test at an adsorbent volume of 29×100 mm, has a third cycle butane breakthrough time at a purge volume of less than 40 1.6 L bed volumes that is within about 10% of the third cycle butane breakthrough time at a purge volume of 390 1.6 L bed volumes.

Embodiment 62: The evaporative emission control system of any preceding embodiment, wherein the second adsorbent volume, when subjected to a butane breakthrough test at an adsorbent volume of 29×100 mm, has a third cycle butane breakthrough time at a purge volume of less than 100 1.6 L bed volumes of at least about 800 seconds.

Embodiment 63: The evaporative emission control system of any preceding embodiment, wherein the bleed emission scrubber further comprises a third adsorbent volume; wherein the second adsorbent volume is a monolithic substrate; and, wherein the third adsorbent volume is a reticulated polyurethane foam.

Embodiment 64: The evaporative emission control system of any preceding embodiment, wherein the 2-Day Diurnal Breathing Loss (DBL) of the system is less than about 20 mg under the California Bleed Emission Test Procedure (BETP).

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

The foregoing aspects, embodiments and other features of the disclosure are explained in the following description, taken in connection with the accompanying drawings, herein.

DETAILED DESCRIPTION OF THE INVENTION

Figure 1:
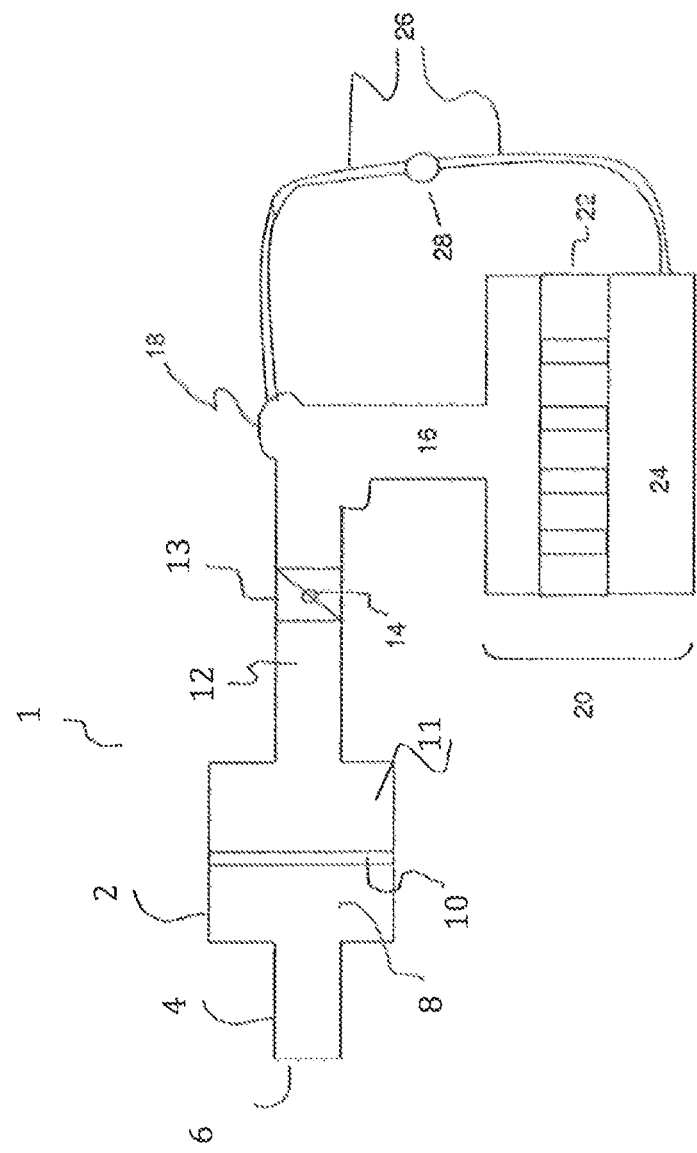
FIG. 1 is a schematic representation of an air intake system of an internal combustion engine.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

Unless otherwise defined, all technical terms used herein have the same meaning as commonly understood by one of ordinary skill in the art to which this disclosure belongs.

The term "adsorbent material," as used herein, refers to an adsorbent material or adsorbent containing material along vapor flow path, and may consist of a bed of particulate material, a monolith, honeycomb, sheet or other material.

I. Coated Substrate for Hydrocarbon Adsorption

In one aspect is provided a coated substrate adapted for hydrocarbon adsorption comprising a substrate comprising at least one surface having a coating thereon, the coating comprising particulate carbon and a binder. The particulate carbon has a BET surface area of at least about 1400 m$^2$/g and a second cycle n-butane adsorption capacity of at least about 9% n-butane by weight. By "second cycle n-butane adsorption capacity" is meant the grams of butane adsorbed per gram of carbon, expressed as wt. %, as measured by exposing the particulate carbon, coated substrate or article to a flow of 100 ml/min of 5% n-butane in nitrogen for 20 minutes to obtain a stable weight, purging the particulate carbon, coated substrate or article with a flow of 100 ml/min nitrogen for 25 minutes, again exposing the particulate carbon, coated substrate or article to a flow of 100 ml/min of 5% n-butane in nitrogen for 20 minutes, and weighing the particulate carbon, coated substrate or article to obtain the weight of adsorbed butane.

The particulate carbon is an activated carbon; activated carbon is a highly porous carbon with a very large surface area, generally at least about 400 m$^2$/g. Activated carbon is well known in the art. See, e.g., commonly-assigned U.S. Pat. No. 7,442,232. See also U.S. Pat. No. 7,467,620. In one embodiment, the BET surface area of the particulate carbon is at least about 1600 m$^2$/g. In one embodiment, the BET surface area of the particulate carbon is from about 1400 m$^2$/g to about 2500 m$^2$/g. In some embodiments, the BET surface area of the particulate carbon is from about 1600 m$^2$/g to about 2500 m$^2$/g. As used herein, the term "BET surface area" has its usual meaning of referring to the Brunauer, Emmett, Teller method for determining surface area by N$_2$ adsorption. Pore diameter and pore volume can also be determined using BET-type N$_2$ adsorption or desorption experiments.

In some embodiments, the particulate carbon has a second cycle n-butane adsorption capacity of at least about 12% n-butane by weight. In some embodiments, the particulate carbon has a second cycle n-butane adsorption capacity of about 9% by weight to about 15% by weight.

As used herein, the term "substrate" refers to the material onto which the adsorbent material is placed, typically in the form of a washcoat. A washcoat is formed by preparing a slurry containing a specified solids content (e.g., 10-50% by weight) of adsorbent in a liquid, which is then coated onto a substrate and dried to provide a washcoat layer. As used herein, the term "washcoat" has its usual meaning in the art of a thin, adherent coating of a material applied to a substrate material. In some embodiments, the coating thickness of the dried washcoat layer is less than about 500 microns.

In some embodiments, the substrate is a component of an air induction system configured for controlling evaporative emissions from a motor vehicle with a combustion engine, a component of an evaporative emission control system, or both. In some embodiments, the substrate is a plastic. In some embodiments, the substrate is a plastic selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In one or more embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

As used herein, the term "monolithic substrate" is a substrate of the type having fine, parallel gas flow passages extending there through from an inlet or an outlet face of the substrate such that passages are open to fluid flow there through. The passages, which may be essentially straight paths or may be patterned paths (e.g., zig-zag, herringbone, etc.) from their fluid inlet to their fluid outlet, are defined by walls on which the adsorbent material is coated as a washcoat so that the gases flowing through the passages contact the adsorbent material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section. Monolithic substrates may be comprised of, for example, metal, ceramic, plastic, paper, impregnated paper, and the like.

In one embodiment, the substrate is an extruded media. In some embodiments, the extruded media is a honeycomb. The honeycomb may be in any geometrical shape including, but not limited to, round, cylindrical, or square. Furthermore, the cells of honeycomb substrates may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right-angled matrix that provides adjacent passages with a range of cross-sectional areas and therefore passages that are not equivalently purged.

In one embodiment, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the foam is a reticulated polyurethane. In some embodiments, the polyurethane is a polyether or polyester. In some embodiments, the substrate is a non-woven.

The hydrocarbon adsorbent coating further comprises an organic binder that will cause the adsorbent coating to adhere to the substrate. Upon application of the coating as a slurry and drying, the binder material fixes the hydrocarbon adsorbent particles to themselves and the substrate. In some cases, the binder can crosslink with itself to provide improved adhesion. This enhances the integrity of the coating, its adhesion to the substrate, and provides structural stability under vibrational conditions encountered in motor vehicles. The binder may also comprise additives to improve water resistance and improve adhesion. Binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof. The preferred binder is an organic polymer. The organic polymer may be a thermosetting or thermoplastic polymer and may be plastic or elastomeric. The binder may be, for example, an acrylic/styrene copolymer latex, a styrene-butadiene copolymer latex, a polyurethane, or any mixture thereof. The polymeric binder may contain suitable stabilizers and age resistors known in the polymeric art. In some embodiments, the binder is a thermosetting, elastomeric polymer introduced as a latex into the adsorbent composition, optionally as an aqueous slurry. Preferred are thermosetting, elastomeric polymers introduced as a latex into the adsorbent composition, preferably as an aqueous slurry.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, polyvinyl alcohol, thermoplastic polyesters, thermosetting polyesters, poly (phenylene oxide), poly(phenylene sulfide), fluorinated polymers such as poly(tetrafluoroethylene), polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. In some embodiment, the polymeric binder is an acrylic/styrene acrylic copolymer latex, such as a hydrophobic styrene-acrylic emulsion. In some embodiments, the binder is selected from the group consisting of an acrylic/styrene copolymer latex, a styrene-butadiene copolymer latex, a polyurethane, and mixtures thereof.

Considerations regarding the compatibility of the components of a slurry comprising a hydrocarbon adsorbent material and a polymeric binder, such as a latex emulsion, are known in the art. See, for instance, commonly-assigned U.S. Publication No. 2007/0107701. In some embodiments, the organic binder can have a low glass transition temperature, Tg. Tg is conventionally measured by differential scanning calorimetry (DSC) by methods known in the art. An exemplary hydrophobic styrene-acrylic emulsion binder having a low Tg is Rhoplex™ P-376 (Trademark of Dow Chemical; available from Rohm and Haas, Independence Mall West, Philadelphia. Pa., 19105). In some embodiments, the binder has a Tg less than about 0° C. An exemplary binder having a Tg less than about 0° C. is Rhoplex™ NW-1715K (Trademark of Dow Chemical; also available from Rohm and Haas). In some embodiments, the binder is an alkyl phenol ethoxylate (APEO)-free, ultra-low formaldehyde, styrenated acrylic emulsion. One such exemplary binder is Joncryl™ 2570. In some embodiments, the binder is an aliphatic polyurethane dispersion. One such exemplary binder is Joncryl™ FLX 5200. Joncryl™ is a Trademark of BASF; Joncryl™ products are available from BASF; Wyandotte, MI, 48192. In some embodiments, the binder is present in an amount from about 10% to about 50% by weight relative to the particulate carbon.

The hydrocarbon adsorbent coatings of the present invention, particularly those slurries containing polymer latexes, can contain conventional additives such as thickeners, dispersants, surfactants, biocides, antioxidants and the like. A thickener makes it possible to achieve a sufficient amount of coating (and hence sufficient hydrocarbon adsorption capacity) on relatively low surface area substrates. The thickener may also serve in a secondary role by increasing slurry stability by steric hindrance of the dispersed particles. It may also aid in the binding of the coating surface. Exemplary thickeners are a xanthan gum thickener or a carboxymethylcellulose thickener. Kelzan® CC, a product of CP Kelco (Cumberland Center II, 3100 Cumberland Boulevard, Suite 600, Atlanta GA, 30339), is one such exemplary xanthan thickener.

In some embodiments, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate, and mixtures thereof. In one embodiment, the dispersant is a low molecular weight polyacrylic acid in which many of the protons on the acid are replaced with sodium. In some embodiments, the dispersant is a polycarboxylate ammonium salt. In some embodiments, the dispersant is a hydrophobic copolymer pigment dispersant. An exemplary dispersant is Tamol™ 165A (Trademark of Dow Chemical; available from Rohm & Haas). While increasing the slurry pH or adding anionic dispersant alone may provide enough stabilization for the slurry mixture, best results may be obtained when both an increased pH and anionic dispersant are used. In some embodiments, the dispersant is a non-ionic surfactant such as Surfynol® 420 (Air Products and Chemicals, Inc). In some embodiments, the dispersant is an acrylic block copolymer such as Dispex® Ultra PX 4575 (BASF).

In some embodiments, it is preferred to use a surfactant, which can act as a defoamer. In some embodiments, the surfactant is a low molecular non-anionic dispersant. An exemplary oil-free and silicone-free defoamer surfactant is Rhodoline® 999 (Solvay). Another exemplary surfactant is a blend of hydrocarbons and non-ionic surfactants, such as Foammaster® NXZ (BASF).

II. Air Intake System for Controlling Evaporative Emissions

The coated substrate for hydrocarbon adsorption as disclosed above can be used as a component of an air intake system configured for controlling evaporative emissions from a motor vehicle with a combustion engine. Therefore, in another aspect is provided an air intake system comprising an air intake duct, an air cleaner housing positioned to receive air from the air intake duct, and one or more clean air ducts in fluid communication with the air filter chamber and the combustion engine for transporting air from the air filter chamber to the combustion engine.

Components of an air intake system typically comprise a three-dimensional hollow interior space or chamber defined at least in part by a shaped planar material, such as molded thermoplastic olefin. By "shaped planar material" is meant a material having two dimensions that are substantially greater than the third dimension, the material having been molded or otherwise shaped into a three-dimensional shape. By "hollow" is meant a cavity substantially filled with a fluid, such as air or exhaust gas. The planar material comprises an inner surface, which is the side facing the hollow interior chamber and an outer surface, which is the side not facing the interior chamber.

The air intake system of the present invention may be more readily appreciated by reference FIG. 1, which is merely exemplary in nature, and is in no way intended to limit the invention or its application or uses. FIG. 1 is a schematic drawing of an air intake system 1. The system 1 comprises an opening 6 of an air intake duct 4 fluidly connected to an air cleaner housing 2, which defines at least in part a hollow interior space in which an air cleaner 10 is located. While the air cleaner housing 2 is depicted as rectilinear, it can be any shape, such as oval or round. The air cleaner 10 functions to absorb dirt and other particulate matter (e.g., dust particles), which may be present in the ambient air and divides the air cleaner housing into a dirty air portion 8, located upstream from the air cleaner 10 and a clean air portion 11 located downstream from the air cleaner 10. It should be recognized that the air cleaner can be any shape and size. The air cleaner housing 2 is connected to an air duct 12 which connects with a throttle body 13 comprising throttle valve 14. An air intake manifold 16 comprising a surge tank 18 connects the throttle body to the engine 20, which comprises the fuel injector and piston assembly 22 and the crankcase 24. A hose 26 comprising a PCV valve 28 is in communication with both the crankcase 24 and with the surge tank 18. The components of the air intake system may be made of metal, plastic, or plastic metal composites.

When the engine 20 is running, the air intake system 2 draws air in from the environment via the air intake duct 4. The air is drawn in through the opening 6 of air intake duct 4, into the dirty air portion 8 of the interior space of the air cleaner housing 2, and through the air cleaner 10 contained therein and into the clean air portion 11 of the interior space. The air cleaner 10 collects the dirt and other particulate matter, which may be in the ambient air, creating a clean air stream. The clean air stream exits from clean air portion 11, via clean air duct 12. The clean air stream passes through the throttle body 13 with its throttle body valve 14 and passes into the air intake manifold 16 which comprises surge tank 18. The clean air is transported into engine 20, comprising a portion 22 containing fuel injectors and piston assembly and a crankcase 24, for use in combustion. Crankcase combustion gases are fed back to the intake manifold 16 via breather tube 26, which contains a positive crankcase ventilation (PCV) valve 28.

The hydrocarbon adsorbent coating or adhered hydrocarbon adsorbent coated substrate can be applied in one or more of several possible locations within an air intake system. It can be applied to the inner surface of the air intake duct 4. It can be applied to the inner surface of the air cleaner housing 2 where the inner surface contacts the dirty air portion 8. This location has the advantage that any coating loss would be captured by the air filter 10, protecting the engine 20 from potential harm. The disadvantage is that this location will have to endure a great amount of dust and other contaminants. The adsorbent coating or coated substrate can be applied to the inner surface of the air cleaner housing 2 on the inner surface which contacts the clean air portion 11. The coating or coated substrate can also be applied to the inner surface of clean air duct 12, the inner walls of the throttle body 13, and/or air intake manifold 16 through which the clean air moves. These locations on the clean side of the air filter have the advantage of being protected from outside contamination. However the coating or coated substrate may still be exposed to contamination from engine oils, etc. In these locations, the adhesion requirement is extreme since it is undesirable to have any coating loss flow into the engine. The throttle body 12 is typically metal and has a very low surface area. The air intake manifold 16 has the disadvantage of high temperature and exposure to high concentrations of fuel vapors and contaminants, as there is a large decrease in hydrocarbon concentration from the engine side of the throttle body to the other. The coating or coated substrate can be applied to a single location or to plural locations within the air intake system. A given location may be entirely coated with the adsorbent, or may be partially coated. A given location may be entirely coated with the adhered coated substrate, or may be partially coated. The coating or coated substrate may be substantially the same thickness throughout a location or throughout the air intake system or may be of varying thickness so as to increase the amount of adsorbent material in one location as compared to another location with a thinner coating.

Evaporative emissions from the engine are adsorbed by the hydrocarbon adsorbent coating or coated substrate during engine offtimes. During engine operation, atmospheric air is introduced into the air intake system, whereby the hydrocarbons, which were previously adsorbed by the hydrocarbon adsorbent, are desorbed and circulated back to the engine for combustion through the clean air duct 12.

According to an embodiment of the invention, at least a portion of an inner surface of at least one of the air intake duct 4, the air cleaner housing 2 and the clean air ducts 12 comprises a hydrocarbon adsorbent coating as disclosed herein, or is in contact with a substrate coated with a hydrocarbon adsorbent coating as disclosed herein, such that the hydrocarbon adsorbent coating is in fluid contact with a pathway for entry of combustion air into the combustion engine of said motor vehicle. The hydrocarbon adsorbent coating and coated substrate are as provided and described in the previous section (I. Coated substrate for hydrocarbon adsorption).

In some embodiments, at least a portion of an inner surface of an air cleaner housing 2 is coated with the hydrocarbon adsorbent coating. In some embodiments, the thickness of the coating layer is less than about 500 microns.

In some embodiments, the substrate is an adhered non-woven. In some embodiments, the thickness of the coating layer on the non-woven is less than about 500 microns. In some embodiments, the adhered non-woven is adhered to at least a portion of the inner surface of one or more of the air intake duct 4, the air cleaner housing 2 or the clean air ducts 12. In some embodiments, the adhered non-woven is adhered to at least a portion of the inner surface of the air filter chamber.

III. Evaporative Emission Control System for Fuel Storage

The coated substrate for hydrocarbon adsorption as disclosed above can be used as a component in an evaporative emission control system for fuel storage. Therefore, in yet another aspect is provided an evaporative emission control system comprising a fuel tank for fuel storage, an internal combustion engine adapted to consume the fuel and an evaporative emission control canister system. The canister system comprises an evaporative emission control canister and a bleed emission scrubber. The evaporative emission control canister comprises a first adsorbent volume, a fuel vapor purge tube connecting the evaporative emission control canister to the engine, a fuel vapor inlet conduit for venting the fuel tank to the evaporative emission control canister, and a vent conduit for venting the evaporative emission control canister to the atmosphere and for admission of purge air to the evaporative emission control canister system. The evaporative emission control canister system is defined by a fuel vapor flow path from the fuel vapor inlet conduit to the first adsorbent volume, toward the bleed emission scrubber and to the vent conduit, and by a reciprocal air flow path from the vent conduit to the bleed emission scrubber, toward the first adsorbent volume, and toward the fuel vapor purge tube. The bleed emission scrubber comprises at least a second adsorbent volume, the second adsorbent volume comprising a coated substrate adapted for hydrocarbon adsorption, wherein the coated substrate comprises at least one surface, and a coating on the at least one surface, the coating comprising particulate carbon and a binder, as provided herein (I. Coated substrate for hydrocarbon adsorption).

Evaporative emissions from the fuel tank are adsorbed by the evaporative emission control system during engine off times. During engine operation, atmospheric air is introduced into the evaporative emission control system, whereby the hydrocarbons, which were previously adsorbed by the adsorbent volumes, are desorbed and circulated back to the engine for combustion. The canister of the evaporative emission control system typically comprises a three-dimensional hollow interior space or chamber defined at least in part by a shaped planar material, such as molded thermoplastic olefin. The evaporative emission control system of the present invention may be more readily appreciated by reference to FIG. 2.

Figure 2:
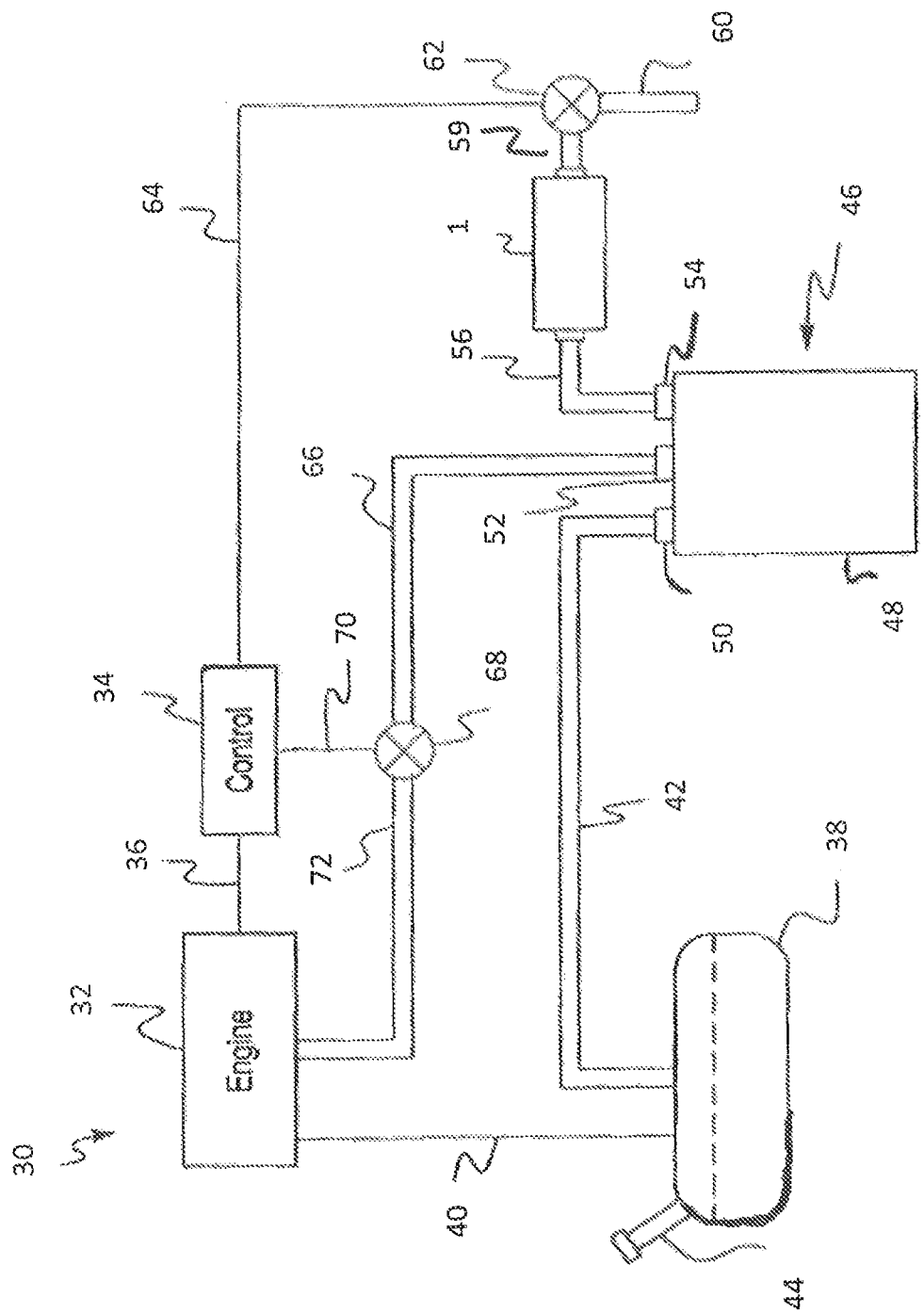
FIG. 2 is a schematic representation of a fuel system including an evaporative fuel emission control system comprising an evaporative emission control canister system provided in accordance with one embodiment.

FIG. 2 schematically illustrates an evaporative emission control system 30 according to one embodiment of the invention. The evaporative emission control system 30 comprises a fuel tank 38 for fuel storage, an internal combustion engine 32 adapted to consume the fuel, and an evaporative emission control canister system. The engine 32 is preferably an internal combustion engine that is controlled by a controller 34. The engine 32 typically burns gasoline, ethanol and other volatile hydrocarbon-based fuels. The controller 34 may be a separate controller or may form part of an engine control module (ECM), a powertrain control module (PCM) or any other vehicle controller.

In accordance with an embodiment of the invention, the evaporative emission control canister system comprises an evaporative emission control canister 46 and a bleed emission scrubber 58. The evaporative emission control canister 46 comprises a first adsorbent volume (represented by 48), a fuel vapor purge tube 66 connecting the evaporative emission control canister 46 to the engine 32, a fuel vapor inlet conduit 42 for venting the fuel tank 38 to the evaporative emission control canister 46, and vent conduit 56, 59, 60 for venting the evaporative emission control canister 46 to the atmosphere and for admission of purge air to the evaporative emission control canister system.

The evaporative emission control canister system is further defined by a fuel vapor flow path from the fuel vapor inlet conduit 42 to the first adsorbent volume 48, through vent conduit 56 toward the bleed emission scrubber 58 and to the vent conduit 59, 60, and by a reciprocal air flow path from the vent conduit 60, 59 to the bleed emission scrubber 58, through vent conduit 56 toward the first adsorbent volume 48, and toward the fuel vapor purge tube 66. The bleed emission scrubber 58 comprises at least a second adsorbent volume, the second adsorbent volume comprising a coated substrate 74 adapted for hydrocarbon adsorption as provided and described herein (I. Coated substrate for hydrocarbon adsorption).

In one embodiment, the evaporative emission control canister 46 is in fluid communication with the bleed emission scrubber 58 via vent conduit 56, and to the engine 32 via fuel vapor purge tube 66, purge valve 68 and purge line 72. In this embodiment, the vent conduit for venting the evaporative emission control canister system to the atmosphere and for admission of purge air to the evaporative emission control canister system comprises several vent conduit segments 56, 59, 60 and valve 62. In an embodiment, the evaporative emission control canister system is defined by a fuel vapor flow path from the fuel vapor inlet conduit 42, through canister vapor inlet 50 to the first adsorbent volume 48, toward the bleed emission scrubber 58 via canister vapor outlet 54 and vent conduit 56, and to the vent conduit and valve (59, 60, and 62), and by a reciprocal air flow path from the vent conduit and valve (60, 62, and 59) to the bleed emission scrubber 58, toward the first adsorbent volume 48 via vent conduit 56 and canister vapor outlet 54, and toward the fuel vapor purge outlet 66.

During engine operation, gasoline is delivered from a fuel tank 38 by a fuel pump through a fuel line to the fuel injector, all represented schematically by line 40. The timing and operation of the fuel injectors and the amount of fuel injected are managed by the controller 34, via signal line 36. The fuel tank 38 is typically a closed container except for an evaporative fuel vapor inlet conduit 42 and a fill tube 44. The fuel tank 38 is often made of blow molded, high density polyethylene provided with one or more gasoline impermeable interior layers.

In an embodiment, the fuel tank 38 includes an evaporative fuel vapor inlet conduit 42 that extends from the fuel tank 38 to the first adsorbent volume 48 of an evaporative emission control canister 46. Fuel vapor, containing hydrocarbons which have evaporated from the fuel tank 38, can pass from the fuel tank 38 to the first adsorbent volume 48 within canister 46 through evaporative vapor inlet conduit 42. The evaporative emission control canister 46 may be formed from any suitable material. For example, molded thermoplastic polymers such as nylon are typically used.

Fuel vapor pressure increases as the temperature of the gasoline in fuel tank 38 increases. Without the evaporative emission control system 30 of the present invention, the fuel vapor would be released to the atmosphere untreated. However, in accordance with the present invention, fuel vapors are treated by evaporative emission control canister 46 and by the bleed emission scrubber 58, located downstream of the evaporative emission control canister 46.

When the vent valve 62 is open, and purge valve 68 closed, fuel vapors flow under pressure from the fuel tank 38 through the evaporative vapor inlet conduit 42, the canister vapor inlet 50 and sequentially through the first adsorbent volume 48 contained within the evaporative emission control canister 46. Subsequently, any fuel vapors not adsorbed by the first adsorbent volume flow out of the evaporative emission control canister 46 via vent conduit opening 54 and vent conduit 56. The fuel vapors then enter bleed emission scrubber 58 for further adsorption. After passage through the bleed emission scrubber 58, any remaining fuel vapors exit the bleed emission scrubber 58 via conduit 59, vent valve 62, and the vent conduit 60, thereby being released to the atmosphere.

Gradually, the hydrocarbon adsorbent material contained in both the evaporative emission control canister 46 and the adsorbent volume of bleed emission scrubber 58 become laden with hydrocarbons adsorbed from the fuel vapor. When hydrocarbon adsorbents become saturated with fuel vapor, and thus, hydrocarbons, the hydrocarbons must be desorbed from the hydrocarbon adsorbents for continued control of emitted fuel vapors from the fuel tank 38. During engine operation, engine controller 34 commands valves 62 and 68, via signal leads 64 and 70, respectively, to open, thereby creating an air flow pathway between the atmosphere and the engine 32. The opening of the purge valve 68 allows clean air to be drawn into bleed emission scrubber 58 and subsequently into the evaporative emission control canister 46 via the vent conduit 60, vent conduit 59 and vent conduit 56, from the atmosphere. The clean air, or purge air, flows in through the clean air vent conduit 60, through bleed emission scrubber 58, through vent conduit 56, through the vent conduit opening 54 and into evaporative emission control canister 46. The clean air flows past and/or through the hydrocarbon adsorbents contained within bleed emission scrubber 58 and the emission control canister 46, desorbing hydrocarbons from the saturated hydrocarbon adsorbents within each volume. A stream of purge air and hydrocarbons then exits evaporative emission control canister 46 through purge opening outlet 52, purge line 66 and purge valve 68. The purge air and hydrocarbons flow through purge line 72 to the engine 32, where the hydrocarbons are subsequently combusted.

Figure 3:
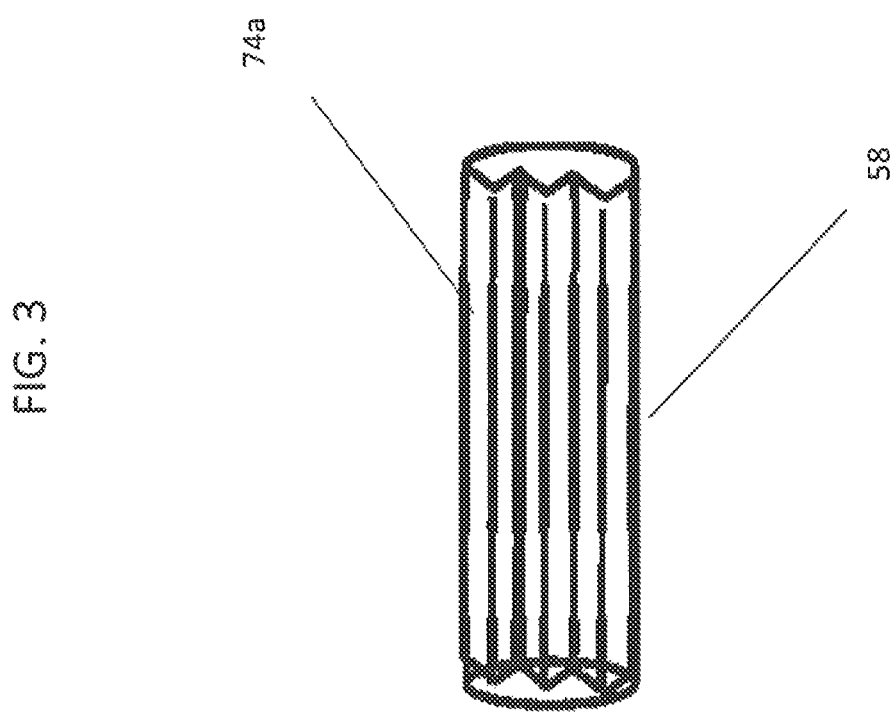
FIG. 3 is a cross-sectional view of a bleed emission scrubber provided according to one embodiment.
Figure 4:
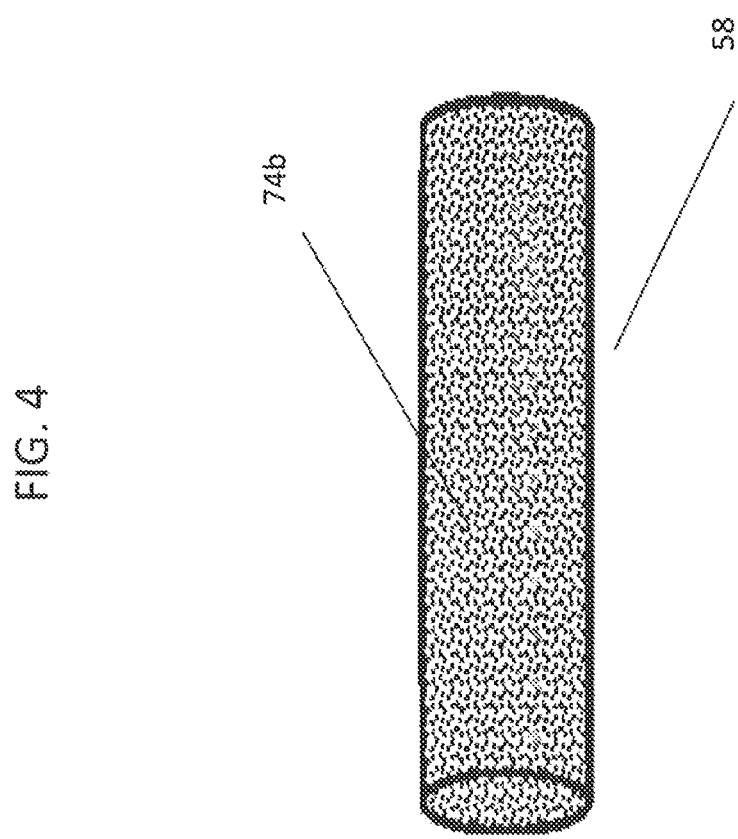
FIG. 4 is a cross-sectional view of a bleed emission scrubber provided according to one embodiment.

In some embodiments, the coated substrate 74 is an extruded media. In some embodiments, the extruded media is a honeycomb. FIG. 3 illustrates an embodiment of bleed emission scrubber 58, wherein the coated substrate 74 is a structured media of pleated form 74a. FIG. 4 illustrates an embodiment wherein the coated substrate 74 is a foam 74b. In one embodiment, the foam 74b has greater than about 10 pores per inch. In some embodiments, the foam 74b has greater than about 20 pores per inch. In some embodiments, the foam 74b has between about 15 and about 40 pores per inch. In one embodiment, the foam 74b is a polyurethane. In some embodiments, the foam 74b is a reticulated polyurethane. In some embodiments, the polyurethane is a polyether or polyester.

Figure 5:
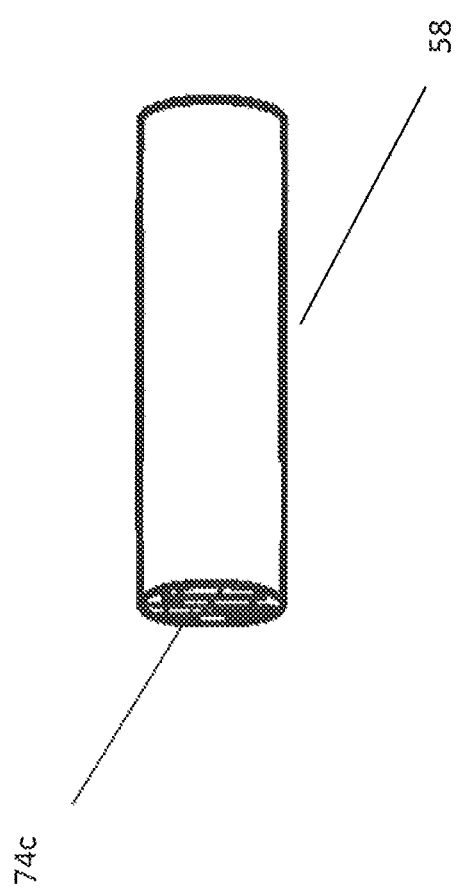
FIG. 5 is a cross-sectional view of a bleed emission scrubber provided according to one embodiment.

FIG. 5 illustrates an embodiment coated substrate 74 is an extruded media 74c. In some embodiments, the extruded media 74c is a honeycomb. The honeycomb adsorbent may be in any geometrical shape including, but not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Without being bound by any theory, it is believed that the more uniform cell cross-sectional areas across the honeycomb faces, the more uniform flow distribution within the scrubber during both adsorption and purge cycles, and, therefore, lower diurnal breathing loss (DBL) emissions from the canister system. In some embodiments, the system can achieve a low diurnal breathing loss (DBL; less than 20 mg per the BETP protocol), representing effective control devices for hydrocarbon emissions.

Surprisingly, it has been found that the adsorbent volume of bleed emission scrubbers as disclosed herein, can, in some embodiments, have a butane working capacity (BWC) lower than that of competitive monoliths, yet still effectively control the hydrocarbon emissions from an evaporative emission control canister under low purge conditions.

In some embodiments, the second adsorbent volume, when subjected to a butane breakthrough test at an adsorbent volume of 29×100 mm, has a third cycle butane breakthrough time at a purge volume of less than 100 1.6 L bed volumes that is within about 10% of the third cycle butane breakthrough time at a purge volume of 390 1.6 L bed volumes. The third cycle butane breakthrough is the time (in seconds) at which the outlet concentration of butane from the adsorbent volume reaches 100 ppm as measured by flame ionization detection during a third loading step of the butane breakthrough test. The butane breakthrough test comprises placing a test adsorbent volume in a sample cell, loading the sample cell with a 1:1 butane/$N_2$ gas mixture at a flow rate of 134 mL/min (10 g/hour of butane flow) for 45 minutes, the direction of flow being upward from the bottom of the sample cell to the top, purging the sample cell with $N_2$ at 100 mL/min for 10 minutes in the same flow direction, desorbing the sample cell with a 25 L/min flow of air in the opposite direction (top to bottom) for a time sufficient to reach the desired number of 1.6 L bed volumes, and repeating the loading, purging and desorbing steps until three load/purge/desorb cycles are complete. In some embodiments, the second adsorbent volume has a third cycle butane breakthrough time at a purge volume of less than 80 1.6 L bed volumes that is within about 10% of the third cycle butane breakthrough time at a purge volume of 390 1.6 L bed volumes. In some embodiments, the second adsorbent volume has a third cycle butane breakthrough time at a purge volume of less than 60 1.6 L bed volumes that is within about 10% of the third cycle butane breakthrough time at a purge volume of 390 1.6 L bed volumes. In some embodiments, the second adsorbent volume has a third cycle butane breakthrough time at a purge volume of less than 40 1.6 L bed volumes that is within about 10% of the third cycle butane breakthrough time at a purge volume of 390 1.6 L bed volumes. In some embodiments, the second adsorbent volume has a third cycle butane breakthrough time at a purge volume of less than 80 1.6 L bed volumes that is within about 10% of the third cycle butane breakthrough time at a purge volume of less than 100 1.6 L bed volumes of at least about 800 seconds.

Particularly, foam substrates as disclosed herein exhibit a lower butane working capacity than competitive monoliths, yet more efficiently control emissions under low purge volumes. Without wishing to be bound by theory, this may be due to the low thickness of the adsorbent coating, and/or the high turbulence of the gas flow though the foam, which may provide more rapid purging than the bulk monolith used in competitive products.

Figure 6:
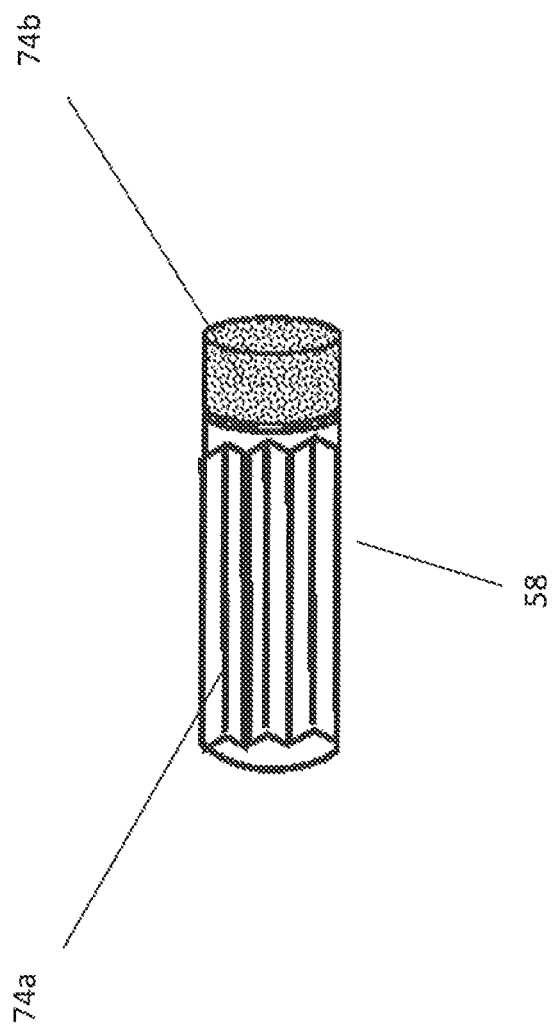
FIG. 6 is a cross-sectional view of a bleed emission scrubber provided according to one embodiment.

In some embodiments, the bleed emission scrubber further comprises a third adsorbent volume. FIG. 6 illustrates such an embodiment wherein the second adsorbent volume comprises a coated substrate 74 as disclosed above, and the third adsorbent volume comprises the coated substrate as disclosed above, wherein the substrate is a foam (74b). In some embodiments, the second adsorbent volume is a monolithic substrate. In some embodiments, the third adsorbent volume is a reticulated polyurethane foam. In some embodiments, the foam 74b has greater than about 10 pores per inch. In some embodiments, the foam 74b has greater than about 20 pores per inch. In some embodiments, the foam 74b has between about 15 and about 40 pores per inch. In some embodiments, the foam 74b is a polyurethane. In some embodiments, the foam 74b is a reticulated polyurethane. In some embodiments, the polyurethane is a polyether or polyester. In some embodiments, a coated monolithic substrate is combined with a coated foam substrate downstream to provide particularly high effectiveness in controlling hydrocarbon emissions under low purge conditions, combining a high capacity substrate with a foam substrate exhibiting good performance under low purge volumes.

As discussed previously, FIGS. 2-6 are merely exemplary embodiments of the disclosed evaporative emission control system, and those skilled in the art may envision additional embodiments without departing from the scope of the present disclosure.

The second adsorbent volume (and any additional adsorbent volumes) may include a volumetric diluent. Non-limiting examples of the volumetric diluents may include, but are not limited to, spacers, inert gaps, foams, fibers, springs, or combinations thereof.

Additionally, the evaporative emission control canister system may include an empty volume anywhere within the system. As used herein, the term "empty volume" refers to a volume not including any adsorbent. Such volume may comprise any non-adsorbent including, but not limited to, air gap, foam spacer, screen, or combinations thereof.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The following examples are provided as illustration and not by way of limitation.

Example 1: Selection of Adsorbent Material

A number of commercially available carbon materials were tested using the following protocol of thermogravimetric analysis (TGA). The material to be tested was equilibrated at room temperature, and exposed to a flow of 100 ml/min of 5% n-butane in nitrogen for 20 minutes to obtain the total butane adsorption capacity of the material. After stabilization of the weight, the sample was purged with a flow of 100 ml/min nitrogen for 25 minutes. The adsorption of butane was repeated to obtain the butane working capacity. This is presented as the second cycle % butane adsorption, reflecting the wt. % value of grams of butane/gram of carbon.

Nitrogen pore size distribution and surface area analysis were performed on Micromeritics TriStar 3000 series instruments. The material to be tested was degassed for a total of 6 hours (a 2 hour ramp to 300° C., then a hold at 300° C. for 4 hours, under a flow of dry nitrogen) on a Micromeritics SmartPrep degasser. Nitrogen BET surface area was determined using 5 partial pressure points between 0.08 and 0.20. The Nitrogen pore size was determined using the BJH calculations and 33 desorption points. Results of BET surface area and adsorption capacity are shown in Table 1.

TABLE 1

Adsorbent Material Surface Area and BWC.

| Material | Form | BET Surface Area m²/g | First Cycle % adsorption % | Second cycle % adsorption % | Ratio of First to Second Cycle % |
|---|---|---|---|---|---|
| Carbon 1 | powder | 1515 | 25.16% | 9.27% | 36.84% |
| Carbon 2 | powder | 1421 | 27.73% | 9.82% | 35.41% |
| Carbon 3 | powder | 1469 | 24.66% | 10.37% | 42.05% |
| Carbon 4 | powder | 1989 | 26.48% | 13.84% | 52.27% |
| Carbon 5 | powder | 1658 | 24.43% | 12.81% | 52.44% |
| Carbon 6 | powder | 2009 | 20.08% | 14.18% | 70.62% |
| Canister carbon | pellets | 1480 | 12.18% | 8.83% | 72.50% |
| Commercial trap | Monolith | 434 | 5.00% | 3.02% | 60.37% |
| Commercial paper | Paper | 499 | 5.10% | 3.61% | 70.78% |

Based on the adsorption capacities listed in Table 1, several carbon materials provided higher second cycle butane adsorption capacity than a commercial hydrocarbon trap or a commercial hydrocarbon adsorption carbon canister.

Example 2: Preparation of Carbon Slurry for Coating of Substrates

Formulation A

A solution of 1.4% Kelzan CC in water was prepared one day in advance of use. Water (310 ml) was combined with 21 ml of the Kelzan CC thickener solution, 0.65 g of Surfynol 420 dispersant and 0.5 g Foammaster NXZ antifoamer and the combination was mixed thoroughly. To this mixture was added 100 g activated carbon adsorbent ("Carbon 1" of Table 1) with stirring. The resulting carbon dispersion was added to a second vessel containing 40 g of Joncryl 2570 binder (50% solution) with stirring. Additional Kelzan CC thickener solution was added until the slurry viscosity was sufficient for coating purposes.

Formulation B

Water (193 ml) was combined with 2.96 g Dispex Ultra PX 4575 dispersant and 0.37 g Foammaster NXZ antifoamer and the combination was mixed thoroughly. To this mixture was added 76 g of activated carbon adsorbent ("Carbon 1" of Table 1) with stirring. The resulting carbon dispersion was added to a second vessel containing 14.8 g of Joncryl 2570 binder (50% solution) with stirring. The resulting carbon slurry was added to a third vessel containing 37 g Joncryl FLX 5200 binder (40% solution) with stirring. Rheovis 1152 thickener was added until the slurry viscosity was sufficient for coating purposes.

Example 3: Coating of Foam Substrates

Cylindrical foam pieces (10 ppi polyurethane) of 29×100 mm (width×length) size were dipped into the Formulation B slurry. The foam was then squeezed to remove excess slurry. The pores of the foam were cleared using an air-knife operated at 15 psig pressure. The foam was dried at 110° C. for 2 h. The procedure was repeated until the desired carbon loading was achieved.

Example 4: Coating of Monolithic Substrates

Cylindrical ceramic monolith substrates (230 cells per square inch) of 29×100 mm size (width×length) were dipped into the Formulation A slurry. Excess slurry was removed by clearing the channels using an air-knife operated at 15 psig pressure. The substrate was dried at 110° C. for 2 h. The procedure was repeated until the desired carbon loading was achieved.

Example 5: Adsorption Capacity and Desorption Time in a Simulated Canister Application A commercial carbon monolith and several coated monoliths and foams, prepared as in Examples 3 and 4, were tested in a butane absorption-desorption setup. The 29×100 mm size cylindrical samples were placed inside a cylindrical sample cell oriented in the vertical direction. The sample cell was then loaded with a 1:1 butane/$N_2$ test gas at a flow rate of 134 mL/min (10 g/hour of butane flow) for 45 minutes. The direction of flow was upward from the bottom of the sample cell to the top. The gas composition of the outlet flow from the sample cell was monitored by an FID (Flame Ionization Detector). After the 45 minute butane adsorption step, the sample cell was purged with $N_2$ at 100 mL/min for 10 minutes in the same flow direction. The sample was then desorbed with a 25 L/min flow of air in the opposite direction (top to bottom) for 25 minutes. The adsorption-purge-desorption sequence is repeated a total of three times.

The relative effective butane adsorption capacity can be correlated to the time it takes for butane breakthrough to occur through the sample. Butane breakthrough is defined as the time at which the outlet concentration of butane from the sample cell reaches 100 ppm. In this test set-up, it required 636 s for butane breakthrough to occur on the third adsorption cycle when a piece of blank 10 ppi foam with no adsorbent coating applied to it was placed in the sample cell. (Table 2). The breakthrough times for 10 ppi, 20 ppi, 30 ppi and 40 ppi foam pieces coated with 2.43 g, 2.19 g, 2.37 g and 2.24 g of active carbon slurry (dry gain, Formulation B from Example 2) had breakthrough times of 857 s, 833 s, 854 s and 842 s, respectively. The increase in breakthrough times compared to the blank foam (636 s) correlates to the relative effective butane adsorption capacity of the adsorbent coating. These results demonstrate a proportional increase in butane capacity from the loading of the coating on the foam with no dependence on the cell density of the foam. A commercial carbon monolith was tested by this method and had an average breakthrough time of 1452 s over three tests. These results show that the coated foams above have ~25% of the butane capacity of the commercial carbon monolith.

TABLE 2

Butane breakthrough times.

| Sample | Butane Breakthrough Time (s) | Butane Breakthrough Time Increase (s) |
| --- | --- | --- |
| 10 ppi foam, uncoated | 636 | |
| 10 ppi foam, coated with 2.43 g of Formulation B | 857 | 221 |
| 20 ppi foam, coated with 2.19 g of Formulation B | 833 | 197 |
| 40 ppi foam, coated with 2.24 g of Formulation B | 842 | 206 |
| Commercial carbon monolith | 1452 | 816 |

Additional tests were run on the commercial carbon monolith, varying the desorption time from 45 minutes to 2.5 minutes. The flow rate was held constant at 25 L/min. The effect on the butane breakthrough time of the third adsorption cycle is presented in Table 3, below. These tests results show that desorbing the butane-saturated commercial carbon monolith for 5 minutes or less does not allow it to fully regenerate, and its butane capacity on subsequent adsorption cycles decreases. Desorption times of 5 minutes and 2.5 minutes correspond to 125 L and 62.5 L (or 78 and 39 bed volumes) of purge, respectively, for a 1.6 L fuel vapor canister.

TABLE 3

Butane breakthrough times for commercial carbon monoliths.

| Desorption Time | Butane Breakthrough Time (s) | Butane Breakthrough Time Increase (s) | Effect on Butane capacity (%) |
| --- | --- | --- | --- |
| 45 minutes | 1471 | 835 | 2% |
| 35 minutes | 1452 | 816 | 0% |
| 25 minutes* | 1451 | 815 | — |
| 15 minutes | 1443 | 807 | −1% |
| 5 minutes | 1345 | 709 | −13% |
| 2.5 minutes | 1237 | 601 | −26% |

*average of three tests

The coated samples of 10 ppi and 40 ppi foam were also tested under decreasing desorption times (5 minutes and 2.5 minutes). The effect on the butane breakthrough time of the third adsorption cycle is presented in Table 4, below. These tests results demonstrate that decreased desorption time had a similar effect on the 10 ppi piece of foam as compared to the commercial carbon monolith, but that the decrease on the effective butane capacity of the 40 ppi piece of coated foam was significantly less. This result indicates that a piece of 40 ppi coated foam desorbs more completely under low purge conditions.

TABLE 4

Butane breakthrough time for coated foam substrates.

| Sample | Desorption Time (min) | Butane Break-through Time (s) | Butane Break-through Time Increase (s) | Effect on butane capacity (%) |
|---|---|---|---|---|
| 10 ppi foam, coated with 2.43 g of Formulation B | 25 minutes | 857 | 221 | |
| | 5 minutes | 823 | 187 | −15% |
| | 2.5 minutes | 804 | 168 | −24% |
| 40 ppi foam, coated with 2.24 g of Formulation B | 25 minutes | 842 | 206 | |
| | 5 minutes | 836 | 200 | −3% |
| | 2.5 minutes | 827 | 191 | −7% |

Example 6: Coating of Airboxes

A hydrocarbon adsorbent material was coated on the inner surface of a commercially-available air cleaner housing (airbox) of an air intake system. The air cleaner housing was made of automotive-grade glass-filled polypropylene and primed with a commercial available adhesion promoter prior to coating. The adsorbent material was Carbon 1 (Example 1). The adsorbent coating composition was as described in Example 2 (Formulation A). The coating was applied as an aqueous slurry (28% solids in water) with a spray gun and then dried at 110° C. for 30 minutes.

Example 7: Coating and Installation of Non-Woven Substrates

A piece of Nomex nonwoven fabric (11"×11") with a weight of 86 g/m² was taped to a flat, rigid substrate around the edges with heat resistant tape. A sample of carbon slurry (55.8 g, prepared according to Example 2, formulation A (27% solids)) was poured onto the nonwoven fabric and evenly distributed to achieve complete coverage. The spatula was worked back and forth over the fabric by hand to form an even coating that penetrated well into the fabric. The treated fabric-substrate combination was then placed in a drying oven at 110° C. and dried until dry to touch. It was then removed from the oven, the tape, removed and the coated nonwoven fabric was peeled from the substrate and returned to the drying oven until fully dry. A sheet of the coated nonwoven fabric, prepared as described, was cut with scissors to an appropriate size to fit inside a commercially available airbox. The properly sized coated nonwoven fabric sheet was fixed in place within the airbox using epoxy.

Example 8: Adsorption Capacity and Desorption Time in a Simulated Application

Airflow tubes from a commercially available automotive airbox were used to test the coating and coating applied to a nonwoven fabric, as described in Examples 6 and 7, in a butane adsorption-desorption set-up. The airflow tubes are a component of the airbox that is positioned at the inlet of the clean side of the airbox. The airflow tubes were received with commercial carbon paper lining the interior surface. This carbon paper was removed prior to the application of the coating or coated nonwoven. The area of the interior surface of the airflow tube that the coating or nonwoven covers was the same as the area that the commercial carbon paper covered. A blank airflow tube and one with the commercial carbon paper in place were also tested. The airflow tubes were mounted in a sample cell consisting of a sealed box with an inlet and outlet, such that flow through the airbox from the inlet flowed through the airflow tube. The sample cell was loaded with a 1:1 mixture of butane/$N_2$ as test gas at a flow rate of 134 mL/min (10 g/hour of butane flow) for 30 minutes. The gas composition of the outlet flow from the airbox was monitored by an FID (Flame Ionization Detector). After the butane adsorption step, the sample cell was purged with $N_2$ at 100 mL/min for 10 minutes in the same flow direction. The sample was then desorbed with a 150 L/min flow of air in the opposite direction for either 25 minutes or 75 minutes. The adsorption-purge-desorption sequence was repeated a total of six times.

The relative effective butane adsorption capacity can be correlated to the time required for butane breakthrough to occur through the sample. Butane breakthrough is defined as the average time when 54 mg of butane breaks through the sample cell as monitored by FID (during the second through the sixth adsorption cycle). The results of the test are presented in Table 5, below. The increase in breakthrough times compared to the blank (1113 s) correlates to the relative effective butane adsorption capacity of the adsorbent coating. When a 25 minute desorption time is used, the airflow tube with 3.3 g of coating has a less effective butane adsorption capacity than the airflow tube with the commercial carbon paper, but a slightly higher butane adsorption capacity when a 75 minutes desorption time is used. The airflow tubes with 5.5 g of coating and 4.0 g of coating on nonwoven both have a more effective butane adsorption capacity than the airflow tube with the commercial carbon paper under both desorption times.

TABLE 5

Butane breakthrough times, airbox coatings.

| | 25 Minute Desorption Time | | 75 Minute Desorption Time | |
|---|---|---|---|---|
| Sample | Butane Break-through Time (s) | Butane Break-through Time Increase (s) | Butane Break-through Time (s) | Butane Break-through Time Increase (s) |
| Blank | 1113 | — | — | — |
| Commercial carbon paper | 1434 | 321 | 1627 | 514 |
| Coating, 3.3 g of Formulation A | 1302 | 189 | 1635 | 522 |
| Coating, 5.0 of Formulation A | 1668 | 555 | 1880 | 767 |
| 4.0 g of Formulation A on nonwoven | 1590 | 477 | 1830 | 717 |

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

What is claimed is:

1. A coated substrate adapted for hydrocarbon adsorption comprising:
   a substrate comprising at least one surface having a hydrocarbon adsorbent coating adhered thereto, the hydrocarbon adsorbent coating comprising particulate carbon and a binder, wherein a thickness of the coating is less than about or equal to 500 micrometers, and wherein the particulate carbon has a BET surface area of at least about 1400 m$^2$/g; and
   wherein the particulate carbon exhibits a second cycle n-butane adsorption capacity of at least about 9% n-butane by weight when tested according to a protocol for which the particulate carbon is initially equilibrated at room temperature and exposed to a flow of 100 ml/min of 5% n-butane in nitrogen for 20 minutes, purged with a flow of 100 ml/min nitrogen for 25 minutes, and again exposed to a flow of 100 ml/min of 5% n-butane in nitrogen for 20 minutes.

2. The coated substrate of claim 1, wherein the BET surface area of the particulate carbon is from about 1400 m$^2$/g to about 2500 m$^2$/g.

3. The coated substrate of claim 1, wherein the particulate carbon has a second cycle n-butane adsorption capacity of about 9% by weight to about 15% by weight.

4. The coated substrate of claim 1, wherein the binder is selected from the group consisting of an acrylic/styrene copolymer latex, a styrene-butadiene copolymer latex, a polyurethane, and mixtures thereof.

5. The coated substrate of claim 1, wherein the substrate is a plastic.

6. The coated substrate of claim 5, wherein the plastic is selected from the group consisting of polypropylene, nylon-6, nylon-6,6, aromatic nylon, polysulfone, polyether sulfone, polybutylene terephthalate, polyphthalamide, polyoxymethylene, poly carbonate, polyvinylchloride, polyester, and polyurethane.

7. The coated substrate of claim 1, wherein the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

8. The coated substrate of claim 1, wherein the substrate is an extruded media.

9. The coated substrate of claim 8, wherein the extruded media is a honeycomb.

10. The coated substrate of claim 1, wherein the substrate is a foam.

11. The coated substrate of claim 10, wherein the foam has between about 15 and about 40 pores per inch.

12. The coated substrate of claim 10, wherein the foam is a reticulated polyurethane.

13. The coated substrate of claim 1, wherein the substrate is a non-woven fabric.

* * * * *